United States Patent [19]

Takase et al.

[11] 4,204,691
[45] May 27, 1980

[54] BREAK PREVENTING GASKET

[75] Inventors: Koyu Takase; Shigeo Makino; Tadashi Naitou, all of Toyota, Japan

[73] Assignee: Toyota Jidosha Kogyo Kabushiki Kaisha, Toyota, Japan

[21] Appl. No.: 924,955

[22] Filed: Jul. 17, 1978

[51] Int. Cl.² ............................................. F16J 15/12
[52] U.S. Cl. ................... 277/235 B; 277/166; 277/180
[58] Field of Search ............ 277/235 B, 188 A, 166, 277/180, 235 A

[56] References Cited

U.S. PATENT DOCUMENTS

| | | | |
|---|---|---|---|
| 368,189 | 8/1887 | Carter | 277/180 X |
| 2,134,868 | 11/1938 | Fitzgerald | 277/235 B |
| 2,191,044 | 2/1940 | Seligman | 277/180 X |
| 3,231,288 | 1/1966 | Hensien | 277/180 X |
| 3,342,501 | 9/1967 | Meyer | 277/180 |
| 3,519,279 | 7/1970 | Wagner | 277/166 |
| 3,643,968 | 2/1972 | Horvath | 277/180 X |
| 3,784,212 | 1/1974 | Doerfling | 277/235 B X |
| 3,863,936 | 2/1975 | Farnam et al. | 277/235 B X |
| 3,930,656 | 1/1976 | Jelinek | 277/235 B X |

FOREIGN PATENT DOCUMENTS

| | | | |
|---|---|---|---|
| 550116 | 12/1957 | Canada | 277/180 |
| 1134096 | 11/1968 | United Kingdom | 277/180 |
| 1213237 | 11/1970 | United Kingdom | 277/180 |
| 1260236 | 1/1972 | United Kingdom | 277/235 B |

*Primary Examiner*—Robert S. Ward, Jr.

[57] ABSTRACT

A gasket for use in the cylinder head of an internal combustion engine comprises a metallic spacer member which is fitted into each through bore or clearance hole of the gasket for insertion of the shank of a a head bolt, said spacer member having a height dimension taken in the thickness direction of the gasket that is smaller than the gasket thickness gained when the gasket is compressed by normal fastening of the head bolt.

6 Claims, 3 Drawing Figures

BREAK PREVENTING GASKET

FIELD OF THE INVENTION

This invention relates to a head gasket for use in a cylinder head, and more particularly to a head gasket which permits prevention of breaks or damage of the gasket due to thermal changes after installation thereof, thereby minimizing reduction in gasket thickness.

DESCRIPTION OF THE PRIOR ART

Conventionally, in the case of a durability test of an internal combustion engine, reduction in thickness of a head gasket for use therein occurred due to the action of heat, water, gases, etc. This caused a decrease in pressure-sealability of the head gasket, which resulted in a broken or damaged condition of same and which further resulted in a deterioration of the engine function itself. Improvement of the gasket performance has therefore been seriously demanded.

SUMMARY OF THE INVENTION

The object of the invention is to provide a head gasket which has a stable function of removing the above-mentioned drawbacks and in which a metallic spacer member is fitted into each through bore of the gasket for insertion of the shank of a head bolt, the spacer member having a height dimension which is taken in the thickness direction of the gasket and which is smaller than the gasket thickness that results when the gasket is compressed by normal fastening of the head bolt, the reducing of the spacer member height being for the purpose of suppressing the likelihood of reduction in the gasket thickness so as to retain the pressure-sealability of the gasket, thereby minimizing its dimensional variation due to the action of, for example, heat.

DESCRIPTION OF SPECIFIC EMBODIMENTS

Figure 1:
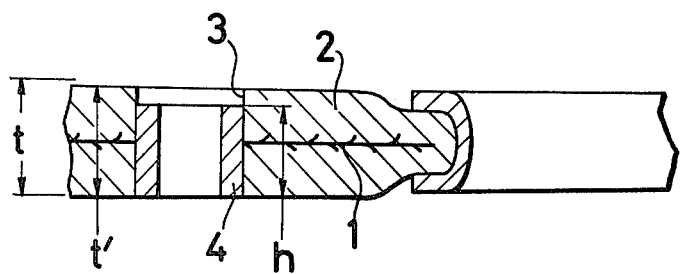
FIGS. 1 and 2 are fragmentary sectional elevational views that respectively show a head gasket according to an embodiment of the present invention, FIG. 1 using rings as the metallic spacer member and FIG. 2 using grommets as same.
Figure 2:
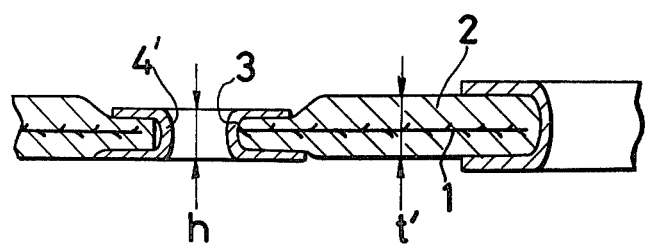

FIG. 1 is a view partly in section of one type of head gasket to which the invention is applied while FIG. 2 is also a partially sectional view of another type of head gasket embodying the invention. The gasket which is illustrated in FIG. 1 is a ring-type gasket and is molded by sandwiching a steel sheet 1 as the core member between two layers of asbestos 2. The standard gasket currently in use is approximately 1.45 mm in overall thickness and 1.6 grams/cm$^3$ in density. Numeral 3 is a through bore or clearance hole for the shank of a head bolt. A metal ring 4 such as that formed of iron, aluminum or copper is inserted into the bore 3. The characterizing feature of the invention is that the height dimension of the ring 4, as taken along the thickness direction of the gasket 1 is less than the gasket thickness which results when the head bolt has been fastened. In this embodiment, the height h of the ring 4 is 1.23 mm with respect to the gasket thickness $t'=1.25$ mm when the head bolt is fastened; and t represents the thickness of the gasket prior to its installation, usually 1.45 mm. Where the gasket is installed as illustrated in FIG. 1, even application of heat to the gasket during the operation of the engine does not cause an excessive reduction in thickness of the gasket since the ring height is set at a value h which is slightly smaller than the gasket thickness $t'$, although such heat application indeed causes a more or less decrease in the gasket thickness.

FIG. 2 shows a grommet type of gasket embodying the invention. The structure of the gasket body is similar to that shown in FIG. 1, and comprises a core-member steel sheet 1, asbestos 2 and a through bore 3. Numeral 4' is a metallic grommet. As in FIG. 1, each constituent element is chosen to have an appropriate dimension which permits establishment of the inequality $h<t$. In the embodiment shown in FIG. 2, for instance, $t=1.45$ mm and $h=1.23$ mm.

Figure 3:
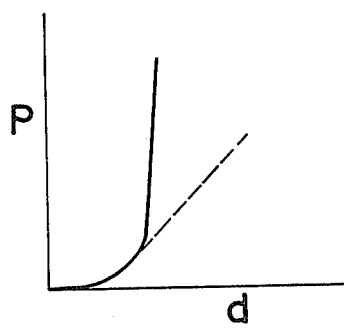
FIG. 3 shows the relation of the variation in load with the variation in thickness of the head gasket.

As will be understood from the foregoing embodiments, the head gasket according to the present invention has a characteristic, as indicated in FIG. 3, which shows a relationship between the variation (p) in the load acting upon the gasket and the variation (d) in the thickness thereof. Namely, the amount of variation in gasket thickness which increases with an increase in the load, as indicated by an extended broken line, is very small after reaching a prescribed amount of variation which accordingly represents a point of change. Namely, the present gasket has a prominently high rigidity which increases the pressure-sealability against the action of gases, water, oils, etc. and prevents breakage or damage thereto when undergoing heat application. Especially, with regard to the amount of variation in tappet clearance, the durability tests concerned showed that the amount of tappet clearance variation with respect to the present gasket was $-0.016$ mm, whereas that with respect to a conventional gasket was $-0.050$ mm. Consequently, the gasket of the present invention can contribute largely to the regulations for fuel gas exhaustion.

Although the foregoing description has referred only to the two embodiments of the invention, the dimension, configuration, etc. of the ring or grommet can be optionally chosen to be optimum by selecting the type of material therefor or in accordance with the rated type, performance, etc, of an engine of application of the resulting gasket.

What is claimed is:

1. A compressible, break-preventing gasket for use with the cylinder head cover of an internal combustion engine, comprising a rigid, metallic spacer member which is fitted into each through bore of said gasket for insertion of a head bolt, said spacer member having a height taken in the thickness direction of said gasket and which height is smaller than the gasket thickness that results when said gasket is compressed by normal fastening of said head bolt.

2. A break preventing gasket according to claim 1, wherein said metallic spacer member is of a ring type.

3. A break-preventing gasket according to claim 1, wherein said metallic spacer member is of a grommet type.

4. A compressible, break-preventing gasket for use with the cylinder head cover of an internal combustion engine, comprising a metallic sheet-like core, upper and lower layers of a compressible material between which said core is sandwiched, said upper and said lower layers having a plurality of bores therethrough for insertion of the head bolts, a rigid, metallic spacer member fitted into each through bore of said gasket for insertion of a head bolt, said spacer member having a height taken in the thickness direction of said gasket and which height is smaller than the gasket thickness that results when said gasket is compressed by normal fastening of said head bolts.

5. A break-preventing gasket according to claim 4, wherein said metallic spacer member is of a ring-type.

6. A break-preventing gasket according to claim 4 wherein said metallic spacer member is of a grommet type.

* * * * *